US012812358B2

(12) United States Patent
Nimbavikar

(10) Patent No.: US 12,812,358 B2
(45) Date of Patent: Nov. 24, 2026

(54) AUTOMATED SUBSCRIPTION TRANSFER USING ELECTRONIC SUBSCRIBER IDENTITY MODULE (eSIM)

(71) Applicant: T-Mobile Innovations LLC, Overland Park, KS (US)

(72) Inventor: Gunjan Nimbavikar, Sammamish, WA (US)

(73) Assignee: T-Mobile Innovations LLC

( * ) Notice: Subject to any disclaimer, the term of this patent is extended or adjusted under 35 U.S.C. 154(b) by 418 days.

(21) Appl. No.: 18/482,730

(22) Filed: Oct. 6, 2023

(65) Prior Publication Data

US 2025/0119727 A1 Apr. 10, 2025

(51) Int. Cl.

*H04W 8/18* (2009.01)
*H04W 4/24* (2024.01)
*H04W 8/20* (2009.01)
*H04W 8/24* (2009.01)

(52) U.S. Cl.

CPC ............. *H04W 8/183* (2013.01); *H04W 4/24* (2013.01); *H04W 8/205* (2013.01); *H04W 8/24* (2013.01)

(58) Field of Classification Search

CPC ....... H04W 8/183; H04W 4/24; H04W 8/205; H04W 8/24; H04W 8/20; H04W 8/18; H04W 4/50; H04W 12/06; H04W 12/72; H04W 12/35; H04W 4/60

See application file for complete search history.

(56) References Cited

U.S. PATENT DOCUMENTS

| | | | | |
|---|---|---|---|---|
| 10,966,080 B1 * | 3/2021 | Chen | H04W 8/183 | |
| 11,146,948 B1 * | 10/2021 | Uehling | H04W 12/30 | |
| 12,003,969 B2 * | 6/2024 | Li | H04W 12/40 | |
| 2016/0088465 A1 * | 3/2016 | Golla | H04W 8/205 | 455/450 |
| 2019/0028884 A1 * | 1/2019 | Namiranian | G06Q 30/04 | |
| 2023/0020761 A1 * | 1/2023 | Chaugule | H04M 17/103 | |
| 2023/0199471 A1 * | 6/2023 | Chaugule | H04W 8/18 | 455/411 |
| 2024/0171964 A1 * | 5/2024 | Chaugule | H04W 12/06 | |

* cited by examiner

*Primary Examiner* — Diane D Mizrahi
*Assistant Examiner* — Iyonda L Lewis

(57) ABSTRACT

A method comprises obtaining, by a provisioning application of a remote subscriber identity module (SIM) provisioning (RSP) system of a core network subscription data associated with at least one of a line of service or a subscription account including the line of service, generating and reserving the electronic SIM (eSIM) profile for a next user equipment (UE) in association with the line of service, wherein the eSIM profile also comprises the subscription data, transmitting the eSIM profile to the next UE while the first UE is still activated in association with the line of service, receiving a notification indicating that the eSIM profile has been downloaded at the next UE, and transmitting a message indicating that the eSIM profile is ready for activation at the next UE while the first eSIM profile is ready for deactivation at the first UE.

20 Claims, 8 Drawing Sheets

AUTOMATED SUBSCRIPTION TRANSFER USING ELECTRONIC SUBSCRIBER IDENTITY MODULE (eSIM)

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A subscriber identity module (SIM) provides a unique number or "identity" to subscribers of cellular network services. A device may be configured with either a physical SIM card or an electronic SIM (eSIM). A physical SIM card is an integrated circuit running a card operating system intended to securely store certain values and related network credentials/keys used to identify and authenticate the device to a cellular network. An eSIM is a digital version of the physical SIM card, identifying the device virtually to provide a network connection. Unlike the physical SIM card that can be inserted and removed, an eSIM may be built into the hardware of the device, and an eSIM may be updated digitally, allowing the device to change carriers and connect to a mobile network without handling a physical SIM card. Both the physical SIM card and the eSIM may require activation before being capable of connecting the device to a carrier network to provide Internet access to the device. The activation methods of the physical SIM card may be different than the activation methods of the eSIM.

SUMMARY

In an embodiment, a method performed by a core network to automatically transfer a subscription to a next user equipment (UE) using an electronic subscriber identity module (eSIM) profile is disclosed. The method comprises receiving, by a billing system of the core network, upgrade data describing the next UE associated with a line of service in a subscription account of a subscriber, in which the upgrade data comprises an electronic identifier (eID) identifying an embedded universal integrated circuit card (eUICC) in the next UE and an identifier of the next UE. The method further comprises obtaining, by a provisioning application of a remote subscriber identity module (SIM) provisioning (RSP) system of the core network from a data store in the core network, subscription data associated with at least one of the line of service or the subscription account in response to receiving an indication of the upgrade data from the billing system, in which the subscription data comprises a mobile station integrated services digital network (MSISDN) of a first UE associated with the line of service and network credentials used to authenticate the first UE to a carrier network associated with the core network, and the first UE comprises a first eSIM profile storing the subscription data. The method further comprises reserving, by the provisioning application of the RSP system, the eSIM profile for the next UE in association with the line of service, wherein the eSIM profile also comprises the subscription data, transmitting, by the provisioning application of the RSP system, the eSIM profile to the next UE while the first UE is still activated in association with the line of service, and receiving, by the provisioning application of the RSP system from the next UE, a notification that downloading or installing of eSIM profile to the next UE is incomplete or failed. In this method, the first UE remains activated in association with the line of service using the first eSIM profile.

In another embodiment, a communication system is disclosed. The communication system comprises an activation application, stored in a first non-transitory memory associated with a billing system, which when executed by a first processor, causes the first processor to be configured to receive a purchase order describing a next UE associated with a line of service in a subscription account of a subscriber, in which the purchase order comprises an electronic identifier (EID) identifying an embedded universal integrated circuit card (eUICC) of the next UE and an identifier of the next UE. The communication system also comprises a provisioning application, stored in a second non-transitory memory associated with a remote subscriber identity module provisioning (RSP) system, which when executed by a second processor, causes the second processor to be configured to obtain subscription data associated with at least one of the line of service or the subscription account, in which the subscription data comprises an mobile station integrated services digital network (MSISDN) of a first UE associated with the line of service and network credentials used to authenticate the first UE to a carrier network associated with a core network, and the first UE comprises a first eSIM profile storing the subscription data, reserve an electronic subscriber identity module (eSIM) profile for the next UE in association with the line of service in response to receiving an indication of the purchase order from the billing system, in which the eSIM profile also comprises the subscription data, transmit the eSIM profile to the next UE while the first UE is still activated in association with the line of service, receive a notification from the next UE indicating that the eSIM profile has been downloaded at the next UE, and transmit a message to the billing system indicating that the eSIM profile is ready for activation at the next UE while the first eSIM profile is ready for deactivation at the first UE.

In yet another embodiment, a method performed by a core network to automatically transfer a subscription to a next user equipment (UE) using an electronic subscriber identity module (eSIM) profile is disclosed. The method comprises obtaining, by a provisioning application of a remote subscriber identity module (SIM) provisioning (RSP) system of a core network, from a data store in the core network, subscription data associated with at least one of a line of service or a subscription account including the line of service, in which the subscription data comprises a mobile station integrated services digital network (MSISDN) of a first UE associated with the line of service and network credentials used to authenticate the first UE to a carrier network associated with the core network, wherein the first UE comprises a first eSIM profile storing the subscription data. The method further comprises generating and reserving, by the provisioning application of the RSP system, the eSIM profile for a next UE in association with the line of service in response to receiving an indication from a billing system of the core network that the next UE has been purchased in association with the line of service, wherein the eSIM profile also comprises the subscription data. The method further comprises transmitting, by the provisioning application of the RSP system, the eSIM profile to the next UE while the first UE is still activated in association with the line of service, receiving, by the provisioning application of the RSP system from the next UE, a notification indicating that the eSIM profile has been downloaded at the next UE, and transmitting, by the provisioning application of the RSP system to the billing system, a message indicating that the eSIM profile is ready for activation at the next UE while the first eSIM profile is ready for deactivation at the first UE.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
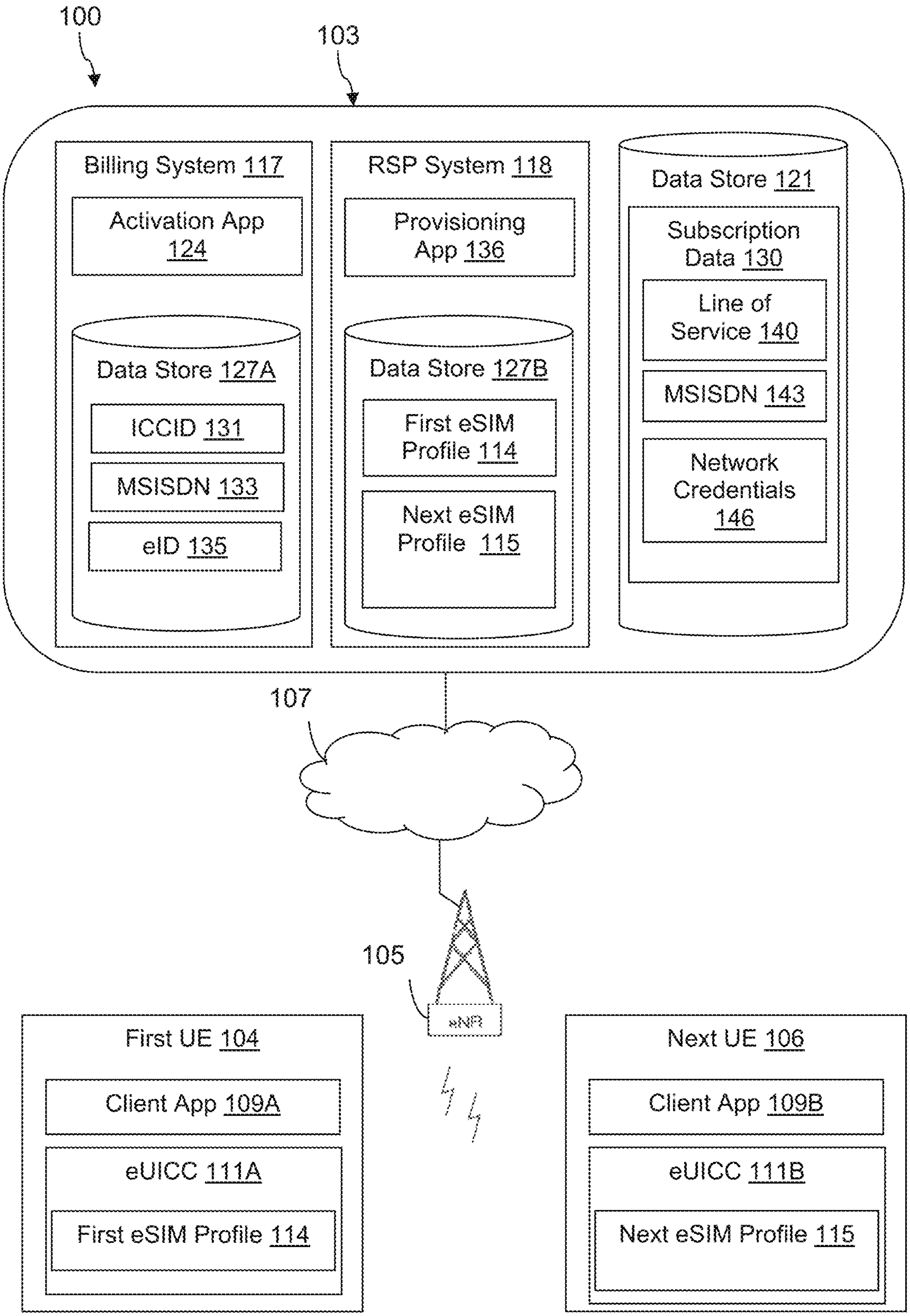
FIG. 1 is a block diagram of a system according to various embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

An existing subscriber of a mobile network operator (MNO) telecommunications company may have a subscription account with the MNO. The subscription account may include information regarding the subscriber, subscription plans, user equipment (UEs) associated with the subscription plans, roaming information, etc. For example, the subscription account may include information identifying the subscriber (e.g., name, home address, customer identifier, and other personally identifying information). The subscription account may include information describing UEs purchased by the subscriber and accessing a cellular network through a carrier network of the MNO according to the subscription plans. For example, the information describing the UEs may include an identifier of the UE (e.g., International Mobile Equipment Identity (IMEI), Mobile Station International Subscriber Directory Number (MSISDN), an Embedded Universal Integrated Circuit Card (eUICC) Identifier (EID), etc.). The subscription account may also include information regarding the subscription plans for each of the UEs and information regarding a line of service for each of the UEs. A line of service may refer to the service provided to a particular UE by the MNO according to one or more subscription plans, all of which may be detailed in the subscription account. The line of service may be associated with a single SIM card or eSIM profile. The subscription account may also include payment information and any other information relevant to the subscriber and/or the agreement between the subscriber and the MNO.

In some cases, the subscriber may wish to replace or upgrade an existing UE in the subscription with another UE, for example, because the new UE may be an upgraded version of the existing UE, or because the new UE has a different feature that the existing UE does not have. For example, the subscriber may currently own a first version of a particular UE, and may wish to upgrade to the second, latest version of the UE. In such a case, the subscriber may purchase the new, next UE from the MNO or another retailer, either online, via telephone, or at a physical store. The subscriber may alternatively obtain the next UE in another manner, such as, for example, by gift or loan. However, the new, next UE may not be activated and permitted to make calls or access a cellular network through the carrier network of the RAN until a SIM card of the MNO is inserted into the next UE or an eSIM profile of the MNO is provisioned at the next UE.

The existing, first UE may be also hereinafter referred to as a "first UE." The replacement UE, which in the example mentioned above may be the next UE, may also be hereinafter referred to as a "next UE." The next UE may be an upgraded version of the first UE, a downgraded version of the first UE, a completely different UE, or any other type of UE that may replace the first UE on a line of service. As described herein, the previous UE and the next UE are associated with the same line of service, but at different times.

In the case of a physical SIM, the subscriber may perform a physical SIM swap between the first UE and the next UE by removing the physical SIM card from the first UE and inserting the same physical SIM into the next UE. The physical SIM card may be associated with a particular line of service in the subscription account, in which the line of service may be associated with a particular subscription plan and a MSISDN, for example. Everything that is stored at the physical SIM (e.g., data such as files or contacts, etc.) may be migrated into the next UE solely by the fact that the physical SIM has been inserted into the next UE. To this end, the physical SIM may include subscription data relevant to the subscriber, the subscription account, the particular line of service associated with the physical SIM card, the network access credentials or keys used to securely authenticate with and access the carrier network, and any other data that may be stored on the physical SIM card. When the subscriber physically swaps the SIM card from the first UE to the next UE, the next UE may gain access to the carrier network using the network access credentials stored in the SIM card, make calls from the MSISDN associated with the SIM card, and ultimately perform similar actions with respect to the carrier network as the first UE.

However, the use of an eSIM sometimes makes the SIM swap process more complicated when the subscriber decides to upgrade a first UE. Instead of using a physical SIM card, an eSIM enabled device may use eSIM profiles to authenticate with the carrier network and access the carrier network in a secure manner. The eSIM enabled device may not require a physical insertion process of the eSIM profile, but may instead involve the core network delivering a customized eSIM profile to the next UE in an over-the-air fashion. To this end, an eSIM profile may contain data similar to the physical SIM card. However, an eSIM profile may not be technically "swapped" between devices as a physical SIM card can be swapped. This may be due to the fact that it may be difficult to easily and securely transfer all of the data from one eSIM profile on the first UE to another eSIM profile on the updated UE, in an automated fashion. In addition, the eSIM profile swap process may sometimes result in the subscriber being left without an activated UE on the line service, due to, for example, delivery delay issues, eSIM profile downloading errors, etc.

There may be various reasons for the afore-mentioned technical problems involved in the eSIM profile swap process. For example, when a subscriber purchases the next UE, the billing system at the core network of the MNO may capture data regarding the upgraded device (e.g., IMEI and eID). The billing system may immediately begin the process of activating the next UE with the contracted-for line of service and begin the process of deactivating the first UE. In some cases, the process of activating the next UE and deactivating the first UE may involve some user action in which the user interacts with one of the UEs, interacts with an online tool, or requests action from a representative of the MNO to initiate the activation and deactivation process.

Therefore, there may be occasions when the first UE is deactivated before the subscriber can use or sometimes even have access to the next UE. For example, the next UE may sometimes encounter an error when downloading the eSIM profile. In this case, when the eSIM profile download has failed at the next UE and the eSIM profile/SIM card at the first UE has been deactivated, the subscriber is left without a line of service on either the first UE or the upgraded UI. Similarly, there may also be occasions when the first UE is deactivated before the next UE is even delivered to the subscriber. For example, the subscriber may have purchased the next UE online, and the next UE may take days or weeks to get delivered to the subscriber. In the meantime, the eSIM profile/SIM card providing the line of service at the first UE may have been deactivated shortly after purchase of the next UE online. In this way, the subscriber is left without a line of service at the first UE which may be accessible to the subscriber, but may have a line of service at the inaccessible next UE, which may still be in the process of being delivered to the subscriber.

Therefore, the process of swapping or changing eSIM profiles from a first UE to a next UE causes technical problems, such as the untimely deactivation of first UEs and the associated reduction in network capacity caused by the need to reactivate first UEs. The process of swapping or changing eSIM profiles from the first UE to the next UEs also sometimes involve unnecessary user actions and confirmations, which may otherwise be automated to increase network and resource capacity.

The present disclosure teaches a technical solution to the foregoing technical problems involved in eSIM profile management across device upgrades, in the field of telecommunications subscription management. In some embodiments, instead of immediately deactivating the line of service at the first UE, the line of service at the first UE may not be deactivated until the eSIM profile is successfully downloaded at the next UE, as further described herein. The downloaded eSIM profile at the next UE may include similar subscription data as the first eSIM profile/SIM at the first UE. In other words, the downloaded eSIM profile at the next UE may include the same, for example, MSISDN and network credentials, as those which are stored with respect to the SIM card or eSIM Profile at the first UE. In addition, the deactivation of the old SIM card/eSIM profile at the first UE and activation of eSIM profile at the next UE may be triggered automatically only when the eSIM profile is completely and successfully downloaded at the next UE, as further described herein.

The embodiments disclosed herein may be performed by various components of a core network associated with the MNO, which may be responsible for providing various call and data services for one or more UEs/devices of the subscriber, according to one or more subscription plans. For example, a billing system and a remote SIM provisioning (RSP) system of the core network may be responsible for performing the methods of automated subscription transfer as disclosed herein. The billing system may include an activation application responsible for receiving an upgrade data detailing the next UE and the existing line of service for which the next UE is to be activated on for the subscriber. The activation application may also be responsible for deactivating the line of service at the first UE using the eSIM profile or SIM card and activating the eSIM profile at the next UE for the line of service, based on the timing and automation factors described herein. The RSP system may include a provisioning application, which may be responsible for reserving and generating an eSIM profile for a next UE upon receiving a notification of the next UE for the existing line of service. The RSP system may also be responsible for providing the reserved eSIM profile to the next UE upon receiving a request and/or confirmation to download the eSIM profile to the next UE.

In operation, a subscriber may purchase or otherwise obtain a new or next UE, which is to replace an existing first UE operating on a line of service based on a subscription plan associated with a subscription account of the subscriber. As mentioned above, the line of service may correspond to a single MSISDN (e.g., a telephone number) or call line in the subscription account. The line of service may be associated with a particular subscription plan, which may be an agreement between the MNO and the subscriber according to which the MNO agrees to provide the UE a set of services under the terms of the agreement.

Identification data of the next UE may be provided to the billing system. When the next UE is purchased either online or at a physical store, the billing system may receive the identification data of the next UE from a purchase order or other type of message received from the online system or a representative of the physical store. The identification data may include, for example, an IMEI and/or eID of the next UE.

The activation application at the billing system may capture this data describing the next UE, the subscription account tied to the subscriber, and the existing line of service currently associated with the first UE but to be transferred to the next UE. The billing system may store this data in a local data store, which may be used later for activation and deactivation purposes.

The billing system may then transmit a message to the RSP system, the message including upgrade data indicating the next UE being tied to the line of service. The upgrade data may include, for example, the identification data of the next UE and/or an identification of the subscription account or line of service to which the next UE is to be tied. For example, the message may include the MSISDN associated with the line of service, which at that point in time may still be tied to the SIM card or eSIM profile at the first UE, but is to be transferred to an eSIM profile to be sent to the next UE.

The provisioning application at the RSP system may then reserve an eSIM profile for the next UE (sometimes referred to hereinafter as the "next eSIM profile" or simply the "eSIM profile"). For example, the RSP system may maintain numerous eSIM profiles, each eSIM profile having a unique integrated circuit card identification (ICCID) identifying a respective eSIM profile. Some of these eSIM profiles may be allocated for a particular subscriber device, and thus may correspondingly include subscription data for the subscriber device or line of service. Other eSIM profiles may be similar to a standard, base eSIM profiles including generic information and files, but not yet allocated for a particular subscriber device. A base eSIM profile, which has not yet been allocated to a subscriber device, may be reserved for the next UE in response to receiving the message from the billing system.

The provisioning application may also obtain the subscription data associated with at least one of the lines of service, subscription account, or next UE. The provisioning application may add this subscription data to the reserved eSIM profile. The subscription data may include the MSISDN of the first UE associated with the line of service. The subscription data may also include network credentials used to authenticate the first UE to a carrier network associated with the core network. The first UE may include a SIM card or an eSIM profile which stores similar subscription data. In this way, the data from the SIM card or eSIM profile at the first UE may be re-created, or migrated, to the newly generated and reserved eSIM profile at the RSP system.

Instead of immediately sending this eSIM profile down to the next UE, thereby activating the next UE on the line of service and triggering deactivation of the line of service at the first UE, the embodiments disclosed herein reserve the eSIM profile at the RSP system. The RSP system may only send the reserved eSIM profile to the next UE when certain conditions are met. For example, the condition may be met when the RSP system receives a notification from the next UE that the eSIM profile has been successfully and completely downloaded at the next UE. To this end, the subscriber may power on the next UE after receiving the next UE, and securely connect to the RSP system (e.g., using a QR code, a WiFi connection, or another secure connection). After securely connecting to the RSP system, the next UE may request download of the eSIM profile reserved for the next UE. The provisioning application of the RSP system may obtain the reserved eSIM profile and provide the reserved eSIM profile to the next UE for download. Once the next UE has completed downloading the eSIM profile, the next UE may transmit a notification to the RSP system indicating successful download of the eSIM profile. The RSP system may then verify or receive verification from the next UE that the next UE may indeed make calls and access the carrier network using the data and files stored at the eSIM profile. If verified, the RSP system may also then discard the reserved eSIM profile. The RSP system may then transmit a message to the billing system including, for example, the ICCID of the eSIM profile, and an instruction to trigger deactivation of the line of service at the first UE and activation of the eSIM profile at the next UE for the line of service.

As another example, the condition may be met when the RSP system receives a notification from the next UE (or the first UE) that the subscriber has provided a confirmation via a user interface of the next UE (or the first UE) to proceed with deactivating the line of service at the first UE and activating the line of service at the next UE. For example, the first UE and the next UE may both include a client application, for example, associated with the MNO. The client application may display a prompt on the respective UE prior to downloading the eSIM profile from the RSP system. The prompt may request the subscriber to confirm whether the subscriber indeed wishes to proceed with deactivating the line of service at the first UE and activating the line of service at the next UE. For example, a display at the UE may include a user interface element, requesting the subscriber to select an icon to confirm or deny proceeding with the activation/deactivation process. When the subscriber selects the confirmation of the activation/deactivation process, the client application may transmit a notification to the RSP system indicating that the subscriber has provided confirmation to proceed. The notification may trigger the RSP system to transmit the eSIM profile down to the next UE 106. Once the next UE 106 has completed download and installation of the eSIM profile, the next UE 106 may send a notification of successfully downloading the eSIM profile to the RSP system. In response to receiving the notification of successful download, the RSP system may transmit a message to the billing system including, for example, the ICCID of the eSIM profile, and an instruction to trigger deactivation of the line of service at the first UE and activation of the eSIM profile at the next UE for the line of service.

In this way, the embodiments disclosed herein provide various technical advantages over prior methods of subscription transfer using eSIM profiles. As disclosed herein, the embodiments disclosed herein reserve eSIM profiles for download until the appropriate time, to prevent the untimely deactivation of first UEs and the associated reduction in network capacity caused by the need to reactivate first UEs. The embodiments disclosed herein also do not involve unnecessary user actions or confirmations at the initial stages before the subscriber may have even received the upgraded device, thereby automating the process of subscription transfer using eSIM profiles. By automating the process, the embodiments disclosed herein also reduce network and processing resource consumption, which may have otherwise been needed to securely and effectively transfer the eSIM profile to a next UE.

Turning now to FIG. 1, a communication system 100 is described. The communication system 100 comprises a core network 103, a cell site 105, a first UE 104, a next UE 106, and a network 107. The core network 103 may be part of a carrier network, both of which may be owned and operated by an MNO. The first UE 104 and the next UE 106 may each be connected to the core network 103 and the carrier network via the cell site 105.

The cell site 105 may provide the first UE 104 and the next UE 106 a wireless communication link to the core network 103 and/or network 107 according to a 5G, a long-term evolution (LTE), a code division multiple access (CDMA), or a global system for mobile communications (GSM) wireless telecommunication protocol. The network 107 may be one or more private networks, one or more public networks, the Internet, or a combination thereof. While FIG. 1 shows the core network 103 as being separate from the network 107, it should be appreciated that, in some embodiments, at least a portion of the core network 103 may be part of the network 107.

The first UE 104 and the next UE 106 may be a cell phone, a mobile phone, a smart phone, a personal digital assistant (PDA), an Internet of things (IoT) device, a wearable computer, a headset computer, a laptop computer, a tablet computer, or a notebook computer. As discussed above, the next UE 106 may in some cases be an upgraded version of the first UE 104, or may have one or more features that the first UE 104 does not possess.

As shown in FIG. 1, the first UE 104 and the next UE 106 may each include a client application 109A-B and an eUICC 111A-B. The eUICC 111A-B may be physically included in the hardware of the first UE 104 and the next UE 106 and may maintain multiple eSIM profiles. The eUICC 111A-B may allow for OTA switching of MNOs by switching between the different eSIM profiles. The eUICC 111A in the first UE 104 may include a first eSIM profile 114, which may be associated with an existing line of service and an MSISDN. The eUICC 111B in the next UE 106 may include a next eSIM profile 115, which, as further described herein, may be downloaded from an RSP system in the core network 103. The next eSIM profile 115 may be a logical transfer of the subscription (e.g., logical transfer of the first eSIM profile 114) to the next UE 106. The next eSIM profile 115 and the first eSIM profile 114 may include similar subscription data and a similar MSISDN, but in some cases, may be identified by different ICCIDs.

The client application 109A-B may comprise instructions stored on a non-transitory memory of the first UE 104 and the next UE 106, which when executed by a processor of the next UE 106, cause the next UE 106 to be configured to download a next eSIM profile 115, present a prompt on a display to receive a user selection of a confirmation, or transmit messages/connect with the RSP system, as further described herein. The client application 109A-B may communicate with the core network 103 using one or more application programming interfaces (APIs) and one or more API calls.

The carrier network may be a network including a radio access network (RAN) and a core network 103. The RAN may include the access network containing the radio elements of a cell network, and the core network 103 may include the elements that manage the subscriber information, call setup and routing, and related system supports. In an embodiment, the core network 103 may be an evolved packet core (EPC) core network. The core network 103 may be configured to implement a 5G, a LTE, a CDMA, or a GSM wireless telecommunication protocol. In one embodiment, the core network 103 may be a 3rd Generation Partnership Project (3GPP) Evolved Packet System (EPS).

As shown in FIG. 1, the core network 103 may include the billing system 117, the RSP system 118, a data store 121, and, as should be appreciated, other systems, servers, and components not otherwise shown or described herein. The billing system 117 may include an activation application 124 responsible for receiving a purchase order or other message describing the next UE 106 and the existing line of service for which the next UE 106 is to be activated on for the subscriber. The activation application 124 may also be responsible for deactivating the line of service provided by the first eSIM profile 114 or SIM card at the first UE 104 and activating the next eSIM profile 115 at the next UE 106 for the line of service, based on the timing and automation factors described herein. The billing system may also include or be coupled to a data store 127A, which may store data associated with devices that are activated with the carrier network and associated with a subscription plan. For example, the data store 127A may store, for each activated UE of the MNO, an ICCID 131 identifying an eSIM profile or SIM card installed at the activated UE, an MSISDN 133 (e.g., telephone number) identifying the line of service tied to the activated UE, an eID 135 identifying eUICC 111A-B maintaining an eSIM profile 114, etc. The billing system 117 may use the data stored at the data store 127A as a record of activated devices that are authorized to access the carrier network to make calls/access the cellular network. The billing system 117 may then monitor actions performed by the activated devices for purposes of billing and service providing.

The RSP system 118 may include a provisioning application 136, which may be responsible for reserving and generating the next eSIM profile 115 for a next UE 106 upon, for example, receiving a notification of the next UE 106 as a replacement device for the line of service. The provisioning application 136 may also be responsible for providing the reserved next eSIM profile 115 to the next UE 106 upon receiving a request and/or confirmation to download the next eSIM profile 115 to the next UE 106. The RSP system 118 may also include and/or be coupled to a data store 127B, which may store the eSIM profiles that have been procured for the MNO and allocated/reserved for an activated device. To this end, the data store 127B may store the first eSIM profile 114 stored in the first UE 104, which may be activated with the carrier network until one or more conditions have been met, as described herein. The data store 127B may also maintain the next eSIM profile 115, which may be downloaded to the next UE 106, again when one or more conditions have been met, as described herein.

In an embodiment, the provisioning application 136 may generate the eSIM profiles, and in particular, the first eSIM profile 114 and/or the next eSIM profile 115 using subscription data 130 stored at the data store 121 of the core network 103. In an embodiment, the data store 121 may be a subscription database, storing data regarding all of the subscribers, subscription accounts, lines of service, activated/deactivated devices, network credentials, subscribed for parameters, applications, etc. As shown in FIG. 1, the subscription data 130 stored at the data store 121 may include data for each subscription account, such as, for example, an indication or identification of one or more lines of service 140 activated for different devices owned by the subscriber and subscribed with a corresponding subscription plan. The subscription data 130 may also include, for example, a MSISDN 133 associated with each line of service 140. The subscription data 130 may also include the network credentials 143, which may be used by the next UE 106 (or the first UE 104 when activated) to access a cellular network via the carrier network of the MNO.

In some embodiments, the provisioning application 136 may generate the next eSIM profile 115 to include subscription data 130, which may be the same as or substantially similar to the subscription data 130 already be included in the first eSIM profile 114. In other words, the subscription data 130 included in the first eSIM profile 114 may be maintained at the data store 121, and thus may be migrated into the next eSIM profile 115 in a secure manner. In this way, the generation of the next eSIM profile 115 securely creates a similar SIM for the next UE 106 at the core network 103 side, without any subscriber involvement in the process of "swapping SIMs" between the first UE 104 and the next UE 106. The transfer of the subscription between the first UE 104 and the next UE 106 may thus be performed automatically on the core network 103 in a safe and secure manner, limiting subscriber involvement, and reducing the processing and transmission load on the system 100 as a whole.

Figure 2A:
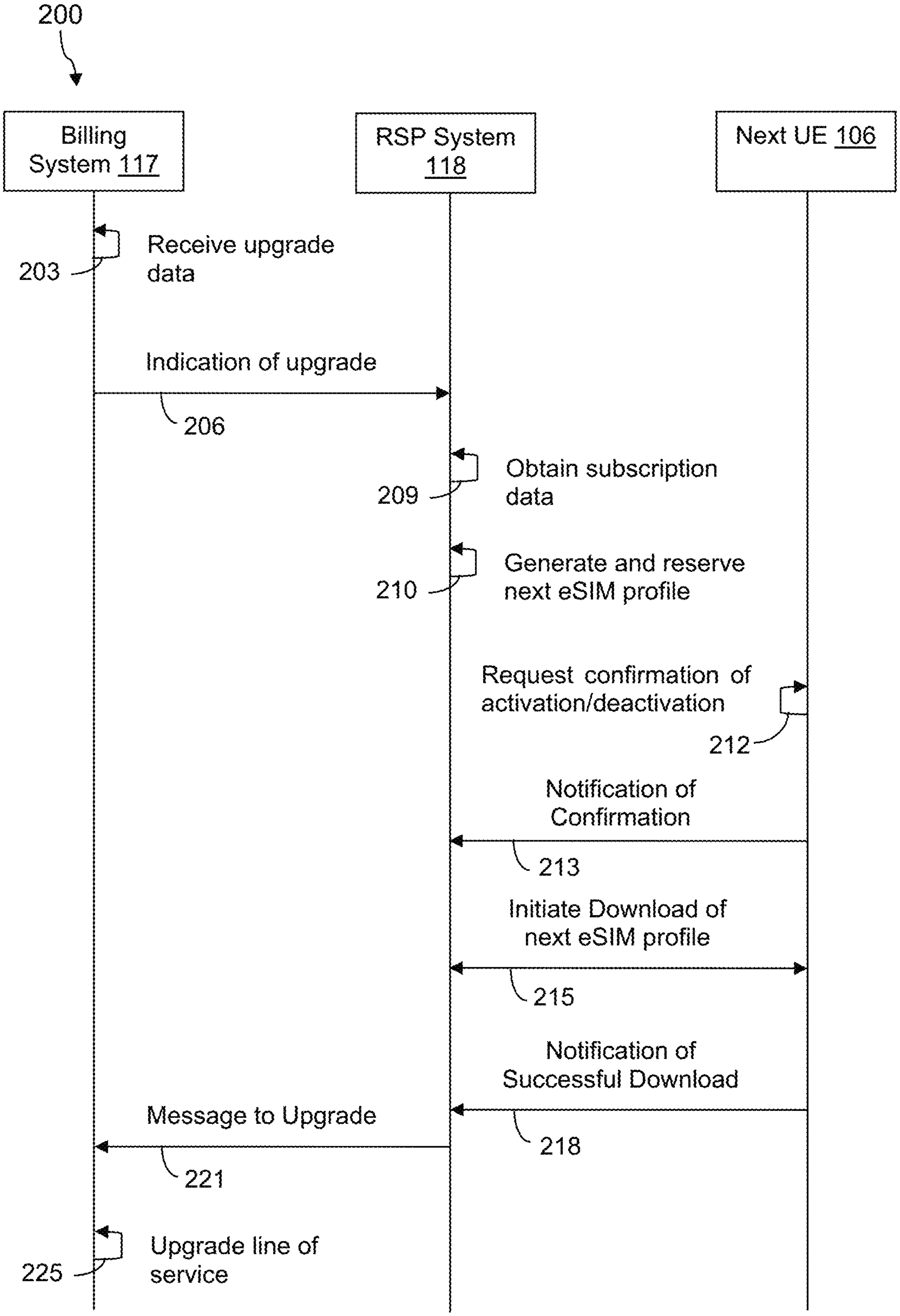
FIGS. 2A-B are message sequence diagrams illustrating communications between components of the system in FIG. 1 to perform a method for automatic subscription transfer according to various embodiments of the disclosure.
Figure 2B:
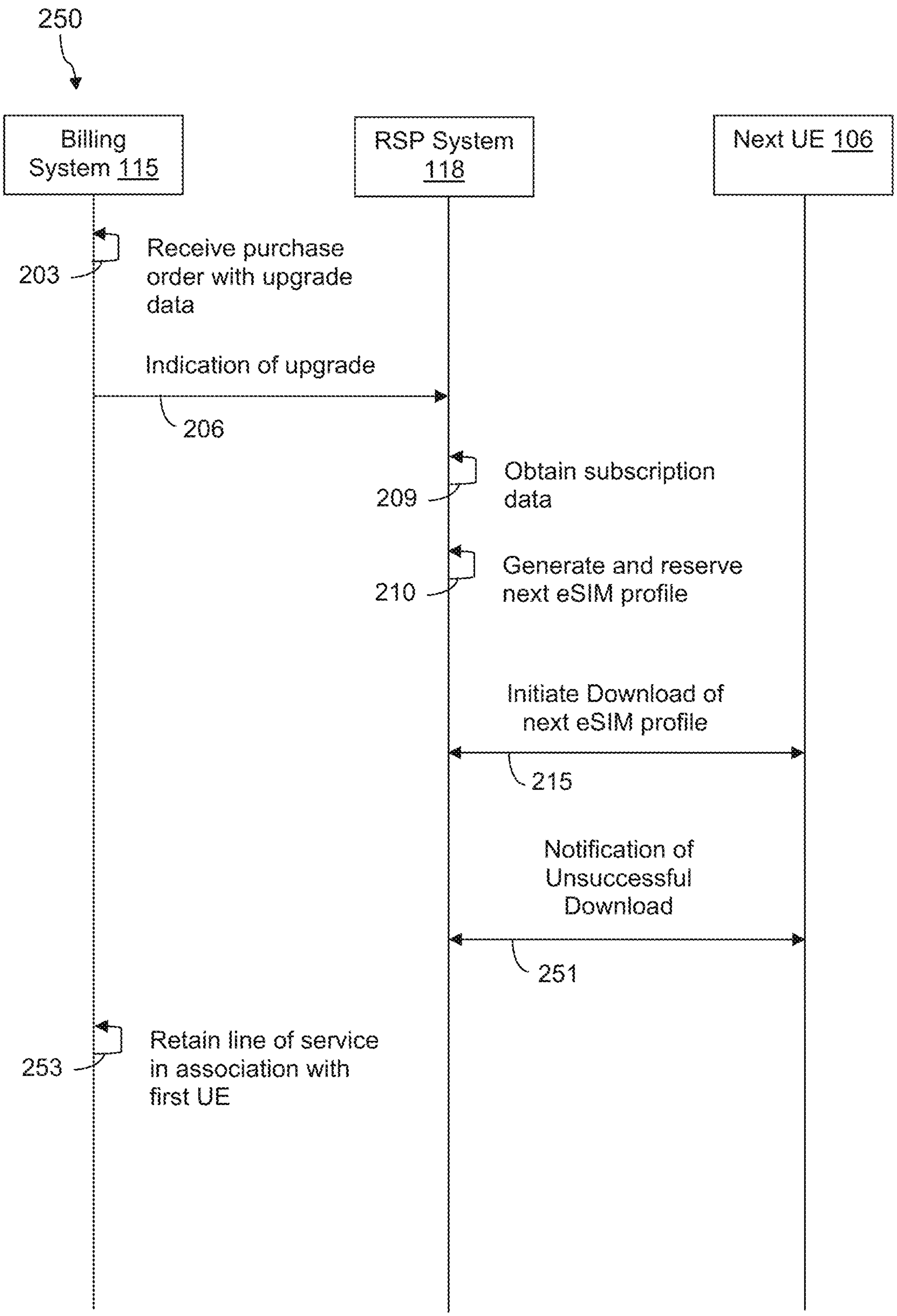

Referring now to FIGS. 2A-B, shown are message sequence diagrams illustrating methods performed by the billing system 117, the RSP system 118, and the next UE 106. In particular, FIG. 2A depicts a method 200 illustrating steps performed by the billing system 117, the RSP system 118, and the next UE 106 when the next eSIM profile 115 is completely and successfully downloaded at the next UE 106. FIG. 2B depicts a method 250 illustrating steps performed by the billing system 117, the RSP system 118, and the next UE 106 when the next eSIM profile 115 has not successfully downloaded at the next UE 106 (i.e., downloading the next eSIM profile 115 at the next UE 106 has failed).

Referring now specifically to FIG. 2A, method 200 begins with step 203. At step 203, the activation application 124 of the billing system 117 may receive upgrade data describing the next UE 106, which have been purchased or otherwise obtained by the subscriber. The upgrade data may be received in the form of a message or a purchase order from, for example, an application or server associated with the MNO or a physical store of the MNO. The purchase order or message may include identification data of the next UE and an indication of an existing line of service 140. The identification data may include an identifier of the next UE 106, such as, for example, an IMEI or MSISDN of the next UE 106. The identification data may also include an eID 135 identifying the eUICC 111B of the next UE 106. The indication of the existing line of service 140 may be, for example, an identifier of the existing line of service 140 and/or the MSISDN 133 associated with the existing line of service 140.

The purchase order or message may indicate that the existing line of service 140 is currently operating at the first UE 104, and the existing line of service 140 is to be transferred to the next UE 106 by transferring eSIM profiles. As described herein, transferring eSIM profiles may refer to at least partially copying the contents of the first eSIM profile 114 at the first UE 104 (and at the data store 121) into a next eSIM profile 115, which may then be downloaded to the next UE 106. The next eSIM profile 115 may include similar subscription data 130 as the first eSIM profile 114, but the next eSIM profile 115 may have, for example, a different ICCID than the first eSIM profile 114.

At step 206, the activation application 124 of the billing system 117 may transmit an indication of the upgrade data to the RSP system 118. For example, the indication of the upgrade data may include at least one of the identification data of the next UE or an indication of the line of service 140 to be upgraded. When the provisioning application 136 of the RSP system 118 receives the indication of the upgrade data from the billing system 117, at step 209, the provisioning application 136 may be triggered to obtain subscription data 130 associated with the line of service 140. The subscription data 130 may be stored in the data store 121 of the core network 103. For example, the provisioning application 136 may search for the subscription data 130 related to an MSISDN 133 associated with the line of service 140. The provisioning application 136 may extract the subscription data 130 from the data store 121.

At step 210, the provisioning application 136 may generate and reserve the next eSIM profile 115. The provisioning application 136 may obtain, for example, a base eSIM profile that may not necessarily be tied to a particular subscriber UE, add the extracted subscription data 130 to the eSIM profile, and associate the eSIM profile to the next UE 104 to generate the next eSIM profile 115. The provisioning application 136 may then determine, based on the received indication of the upgrade data, that this next eSIM profile 115 relates to a subscription transfer for a device upgrade (from the first UE 104 to the next UE 106). In response to this determination, at step 210, the provisioning application 136 may reserve the next eSIM profile 115, instead of sending the next eSIM profile 115 down to the next UE 106 for download and installation.

In an embodiment, certain conditions may need to be met before the next eSIM profile 115 may begin downloading at the next UE 106. For example, the subscriber may not only need to physically have possession of the next UE 106 (i.e., the next UE 106 may need to be mailed to the subscriber and received by the subscriber), but the subscriber may confirm activation of the next UE 106 and deactivation of the first UE 104 before downloading the next eSIM profile 115. In this embodiment, at step 212, a client application 109B may display a prompt on the next UE 106. The prompt may request the subscriber to confirm whether the subscriber indeed wishes to proceed with deactivating the line of service 140 at the first UE 104 and activating the line of service 140 at the next UE 106. For example, the display at the next UE 106 may include a user interface element, requesting the subscriber to select confirmation or denial of the activation/deactivation process. When the subscriber selects the confirmation of the activation/deactivation process via the user interface element, at step 213, the client application 109B may transmit a notification to the RSP system 118 indicating that the subscriber has provided confirmation to proceed. The notification may only be transmitted to the RSP system 118 when the subscriber has selected such confirmation at the next UE 106.

After receiving the confirmation, at step 215, the next UE 106 may initiate download of the next eSIM profile 115. The next UE 106 may, for example, request download of the next eSIM profile 115 reserved for the next UE 106, or the line of service 140, using a QR code or some other secure connection to the RSP system 118. The provisioning application 136 may then provide or transmit the next eSIM profile 115 to the next UE 106. In the embodiment shown in FIG. 2A, the next UE 106 may receive the next eSIM profile 115, and then download and install the next eSIM profile 115 to the eUICC 111B at the next UE 106.

Once the next UE 106 has successfully completed downloading and installing the next eSIM profile 115 to the eUICC 111B, at step 218, the client application 109B of the next UE 106 may transmit a notification to the RSP system 118 indicating that the next eSIM profile 115 has successfully been provisioned at the next UE 106. In some cases, the client application 109B may transmit this notification to the RSP system 118 only after the next UE 106 has confirmed that the network credentials 146 stored in the next eSIM profile 115 may be used to properly authorize and identify the next UE 106 with the carrier network of the MNO and that the network credentials 146 stored in the next eSIM profile 115 may be used to make calls from the MSISDN 133 associated with the line of service 140.

The provisioning application 136 of the RSP system 118 may receive this notification of the successful eSIM provisioning at the next UE 106, and in response to receiving this notification, at step 221, transmit a message to the billing system 117 to perform the upgrade and subscription transfer of the line of service 140 from the first UE 104 to the next UE 106. The message may include an instruction for the billing system 117 to perform the upgrade and subscription transfer, which may trigger the activation application 124 to deactivate the line of service 140 at the first UE 104 using the first eSIM profile 114 and activate the line of service 140 at the next UE 106 using the next eSIM profile 115. In some cases, activation of the next eSIM profile 115 at the next UE 106 for the line of service 140 may involve the billing system 117 initiating the monitoring of actions, calls, data packets, etc. sent/received/performed by the next UE 106 with respect to the subscription plans of the next UE 106, for billing purposes. Activation may also involve updating the local database 127A to indicate the new ICCID 131 identifying the next eSIM profile 115 for the line of service 140 at the next UE 106. Meanwhile, deactivation of the old SIM card or eSIM profile 114 at the first UE 104 may involve sending instructions to one or more NEs in the carrier network to disallow access of the carrier network to first UE 104 and prohibit the first UE 104 from making calls using the MSISDN 133 associated with the transferred line of service 140. Deactivation may also involve stopping the monitoring of various actions and calls sent/received/performed by the first UE 104 with respect to the line of service 140 associated with the first eSIM profile 114 or SIM card.

Turning now to FIG. 2B, method 250 is depicted illustrating steps performed by the billing system 117, the RSP system 118, and the next UE 106 when the next eSIM profile 115 has not successfully downloaded at the next UE 106 (i.e., downloading the next eSIM profile 115 at the next UE 106 has failed). Method 250 includes steps 203, 206, 209, 210, and 215, which are similar to those described above with reference to method 200 of FIG. 2A. Unlike method 200 of FIG. 2A, method 250 includes steps 251 and 253, which relate to the failure of downloading and installing the next eSIM profile 115 at the next UE 106.

At step 251, the client application 109B of the next UE 106 may detect that eSIM profile 115 download at the next UE 106 has failed. Such a failure may occur for a variety of reasons, not otherwise limited herein. For example, the failure may occur due to incompatibility between the next UE 106 and the next eSIM profile 115, a lack of configuration at the next UE 106, a corrupted file in the next eSIM profile 115, etc. The client application 109B may then transmit a notification to the RSP system 118 indicating the failure of downloading and installing the next eSIM profile 115 at the next UE 106. The notification may also include a cause of the failure, or an indication that the cause of the failure is not known. The client application 109B may also notify the subscriber of this failure by displaying a user interface element indicating the failure, either at the updated UE 106 or even at the first UE 104.

Once the RSP system 118 receives this notification, the RSP system 118 may actively refrain from sending a message to upgrade and transfer the subscription from the first UE 104 to the next UE 106, to prevent the line of service 140 at the first UE 104 from being deactivated. This may be because if the line of service at the first UE 104 is deactivated, and the line of service 140 at the next UE 106 is not functioning due to the failed next eSIM profile 115 download, the subscriber may be left without the line of service 140 (i.e., an active device) at either the first UE 104 or the next UE 106. To this end, at step 253, the activation application 124 of the billing system 117 may take no action, and retain the line of service 140 in association with the first UE 104.

Figure 3:
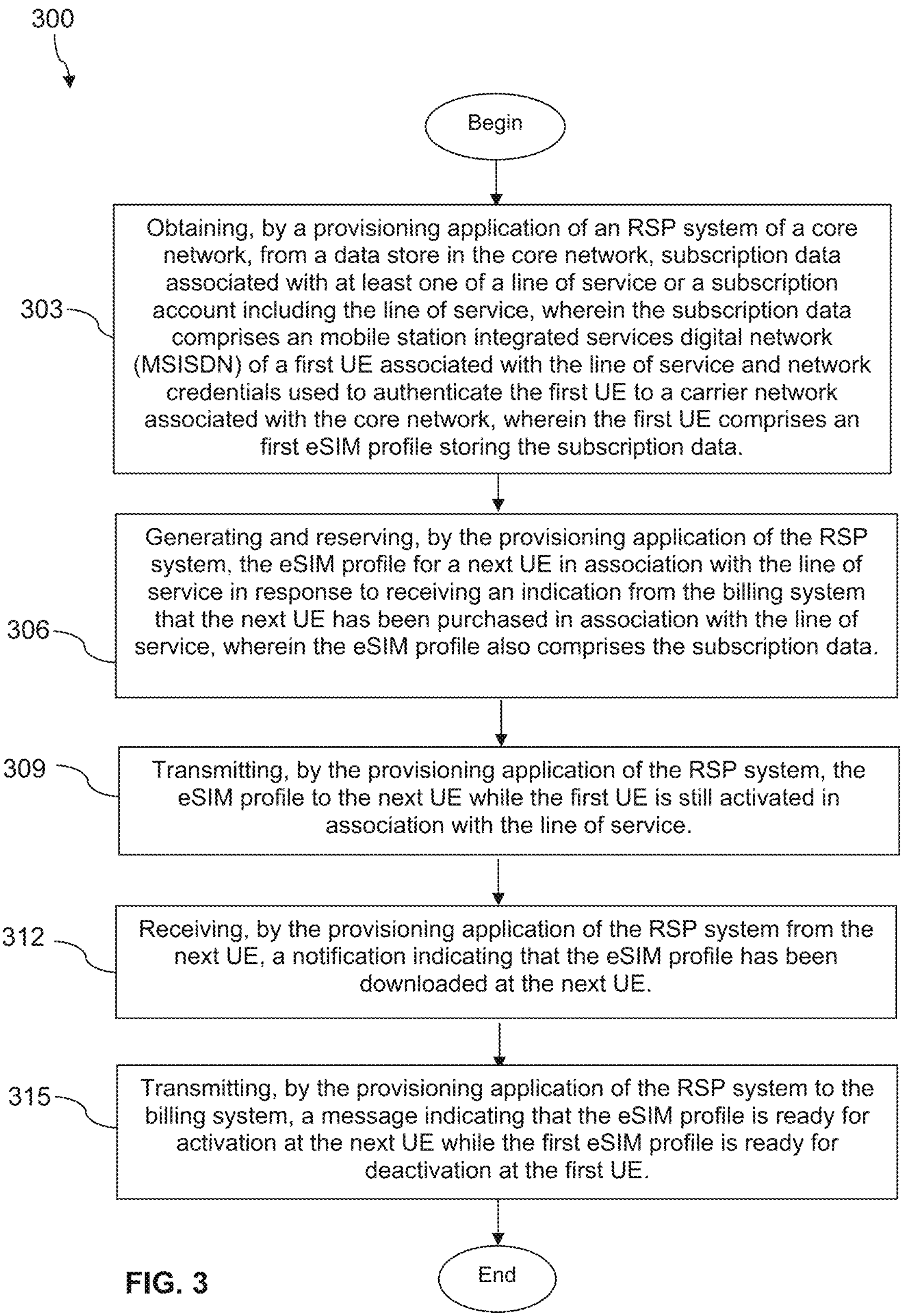
FIG. 3 is a flow chart of a method for automatic subscription transfer according to various embodiments of the disclosure.

Referring now to FIG. 3, shown is a method 300. Method 300 may be a method for automatically transferring a subscription (e.g., line of service 140) from a first UE 104 to a next UE 106 using a next eSIM profile 115. Method 300 may be performed by the core network 103 in the communication system 100. In an embodiment, method 300 may be performed after a subscriber has purchased or otherwise obtained a next UE 106.

At step 303, method 300 comprises obtaining, by a provisioning application 136 of an RSP system 118 of a core network 103, from a data store 121 in the core network 103, subscription data 130 associated with at least one of a line of service 140 or a subscription account including the line of service 140. In an embodiment, the subscription data 130 comprises a MSISDN 133 of a first UE 104 associated with the line of service 140 and network credentials 146 used to authenticate the first UE 104 to a carrier network associated with the core network 103. In an embodiment, the first UE 104 comprises a first eSIM profile 114 storing the subscription data 130.

At step 306, method 300 comprises generating and reserving, by the provisioning application 136 of the RSP system 118, the eSIM profile 115 for a next UE 106 in association with the line of service 140 in response to receiving an indication from the billing system 117 that the next UE 104 has been purchased in association with the line of service 140. In an embodiment, the eSIM profile 115 also comprises the subscription data 130.

At step 309, method 300 comprises transmitting, by the provisioning application 136 of the RSP system 118, the eSIM profile 115 to the next UE 106 while the first UE 104 is still activated in association with the line of service 140. At step 312, method 300 comprises receiving, by the provisioning application 136 of the RSP system 118 from the next UE 106, a notification indicating that the eSIM profile 115 has been downloaded at the next UE 106. At step 315, method 300 comprises transmitting, by the provisioning application 136 of the RSP system 118 to the billing system 117, a message indicating that the eSIM profile 115 is ready for activation at the next UE 106 while the first eSIM profile 114 is ready for deactivation at the first UE 104.

In some embodiments, method 300 may include additional features and steps not shown in FIG. 3. In an embodiment, method 300 may include, in response to the message, activating, by an activation application of the billing system, line of service at the next UE by activating the eSIM profile at the next UE, and deactivating, by the activating application of the billing system, the line of service at the first UE by deactivating the first eSIM profile at the old device. In an embodiment, the first eSIM profile comprises a first integrated circuit card identification (ICCID), and wherein the new eSIM profile comprises a second ICCID different from the first ICCID. In an embodiment, the message further comprises the second ICCID. In an embodiment, prior to the eSIM profile being transmitted to the next UE, the method further comprises displaying, by a client application of the next UE, a notification that downloading the eSIM profile at the next UE will trigger deactivation of the line of service at the first UE, receiving, by the client application of the next UE, a selection indicating to proceed with downloading the eSIM profile at the next UE to trigger deactivation of the line of service at the first UE, and transmitting, by the client application of the next UE, to the provisioning application of the RSP system, a confirmation that the eSIM profile is to be sent to the next UE. In an embodiment, the transmitting, by the provisioning application of the RSP system, the eSIM profile to the next UE is only performed in response to the confirmation being received.

Figure 4:
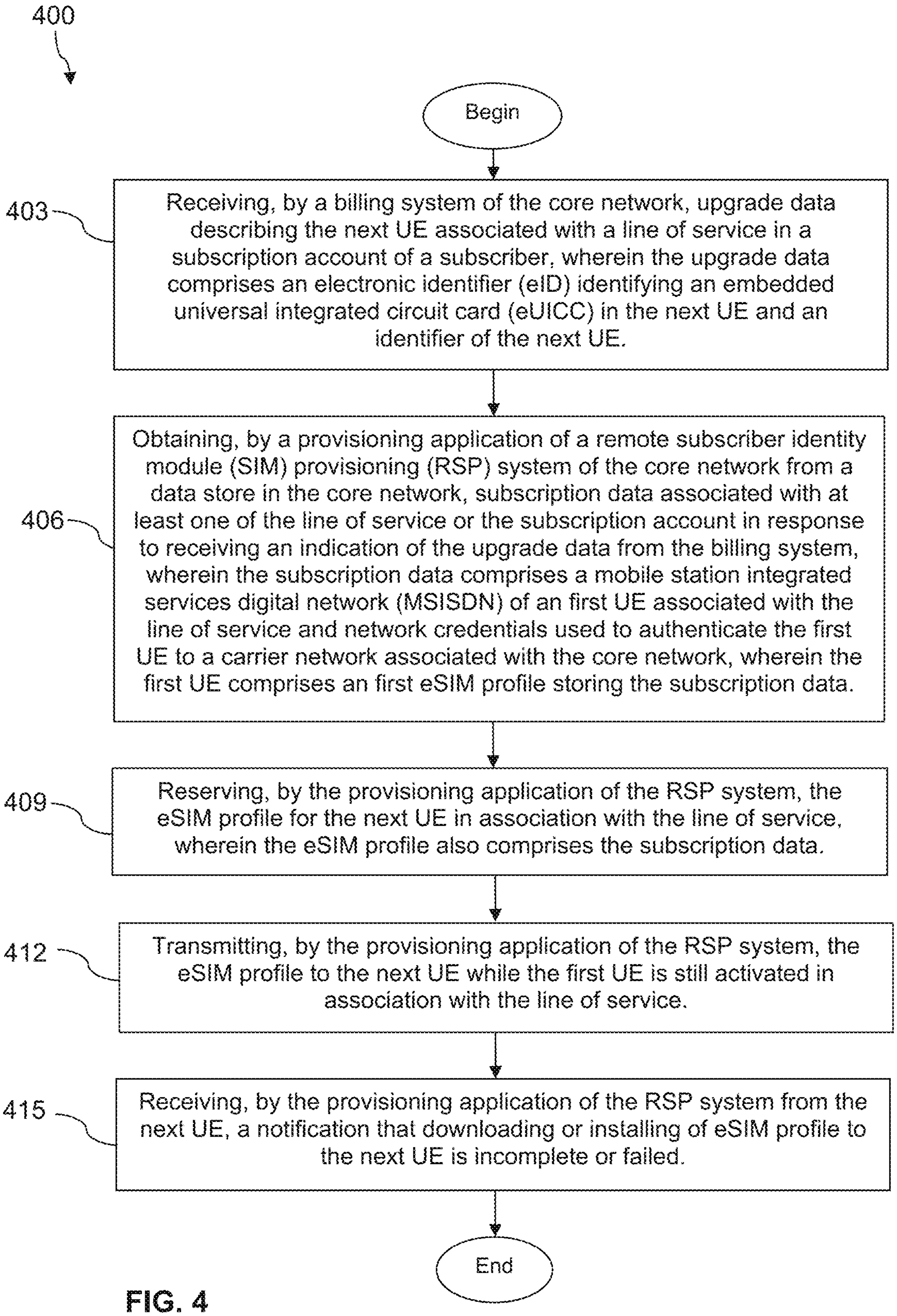
FIG. 4 is a flow chart of another method for automatic subscription transfer according to various embodiments of the disclosure.

Referring now to FIG. 4, shown is a method 400. Method 400 may be a method for automatically transferring a subscription (e.g., line of service 140) from a first UE 104 to a next UE 106 using a next eSIM profile 115. Method 400 may be performed by the core network 103 in the communication system 100. In an embodiment, method 400 may be performed after a subscriber has purchased or otherwise obtained a next UE 106.

At step 403, method 400 comprises receiving, by a billing system 117 of the core network 103, upgrade data describing the next UE 104 associated with a line of service 140 in a subscription account of a subscriber. In an embodiment, the upgrade data comprises an electronic identifier (eID) 135 identifying an embedded universal integrated circuit card (eUICC) in the next UE 106 and an identifier of the next UE 106.

At step 406, method 400 comprises obtaining, by a provisioning application 136 of an RSP system 118 of the core network 103 from a data store 121 in the core network 103, subscription data 130 associated with at least one of the lines of service 140 or the subscription account in response to receiving an indication of the upgrade data from the billing system 117. In an embodiment, the subscription data comprises a MSISDN 133 of a first UE 104 associated with the line of service 140 and network credentials 146 used to authenticate the first UE 104 to a carrier network associated with the core network 103. In an embodiment, the first UE comprises a first eSIM profile storing the subscription data 130.

At step 409, method 400 comprises reserving, by the provisioning application 136 of the RSP system 118, the eSIM profile 115 for the next UE 106 in association with the line of service 140. In an embodiment, the eSIM profile also comprises the subscription data 130. At step 412, method 400 comprises transmitting, by the provisioning application 136 of the RSP system 118, the eSIM profile 115 to the next UE 106 while the first UE 104 is still activated in association with the line of service 140. At step 415, method 400 comprises receiving, by the provisioning application 136 of the RSP system 118 from the next UE 106, a notification that downloading or installing of eSIM profile 115 to the next UE 106 is incomplete or failed. In an embodiment, the first UE 104 remains activated in association with the line of service 140 using the first eSIM profile.

In some embodiments, method 400 may include additional features and steps not shown in FIG. 4. In an embodiment, the first eSIM profile is stored in an eUICC of the first UE. In an embodiment, method 400 comprises transmitting, by the billing system to the RSP system, the indication of the upgrade data prior to reserving the eSIM profile for the upgraded device in association with the line of service, wherein the indication of the upgrade data comprises at least one of an identification of the subscription account, an identification of the line of service, the EID identifying the eUICC of the next UE, or an international mobile equipment identity (IMEI) identifying the next UE. In an embodiment, method 400 comprises displaying, by a client application of the next UE, a notification that downloading the eSIM profile at the next UE will trigger deactivation of the line of service at the first UE. In an embodiment, method 400 comprises receiving, by the client application, a selection indicating to proceed with downloading the eSIM profile at the next UE to trigger deactivation of the first UE in association with the line of service. In an embodiment, method 400 comprises detecting, by the client application, that downloading or installation of the eSIM profile at the next UE has failed, resulting in an inability to download the eSIM profile at the next UE, and displaying, by the client application, a notification at the next UE indicating that the eSIM profile was not able to be downloaded. In an embodiment, the next UE is a later model of the first UE.

Figure 5A:
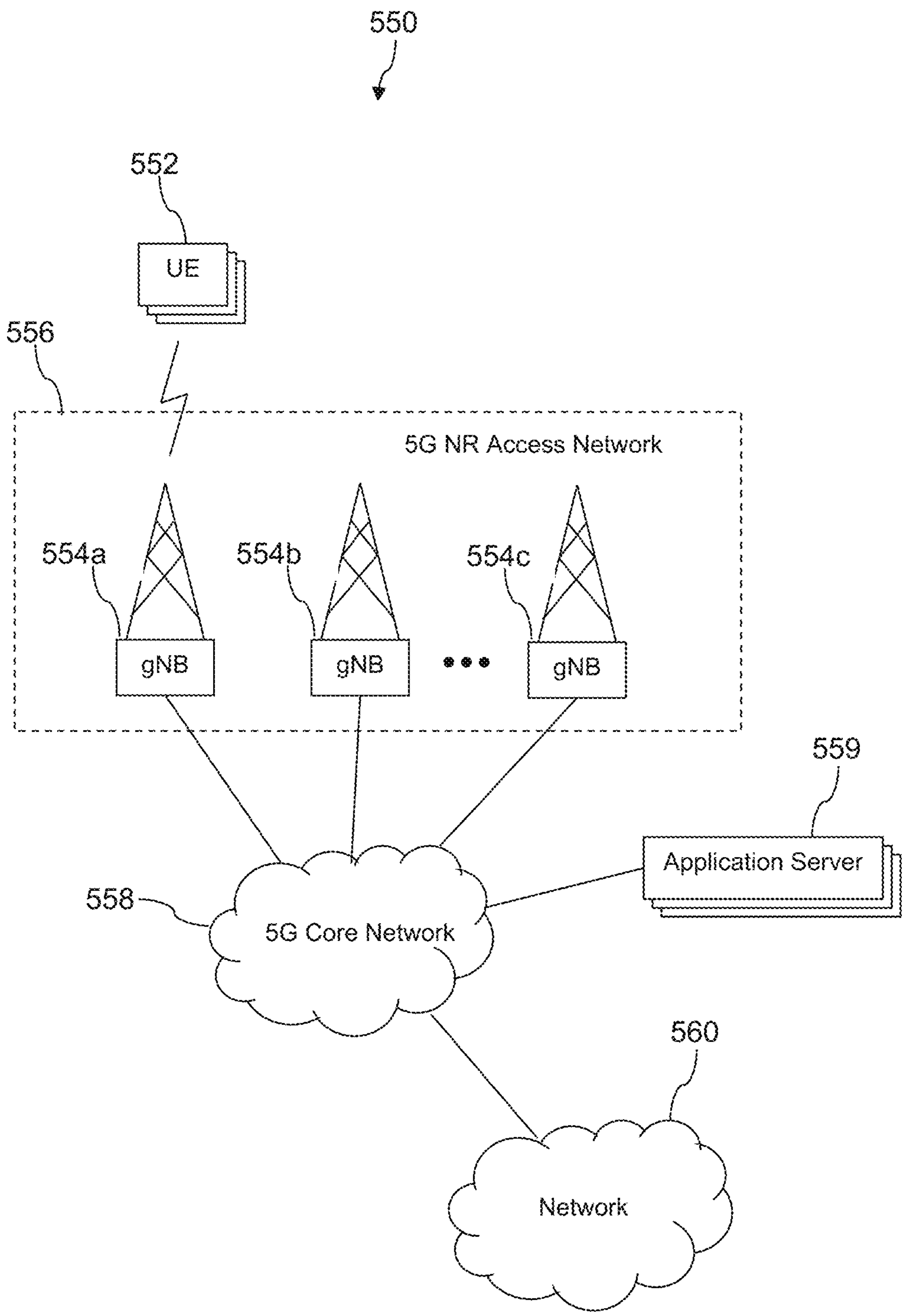
FIG. 5A and FIG. 5B are block diagrams of a 5G network according to an embodiment of the disclosure.

Turning now to FIG. 5A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node **554*a*, a second access node 554*b*, and a third access node 554*c*. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554** with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
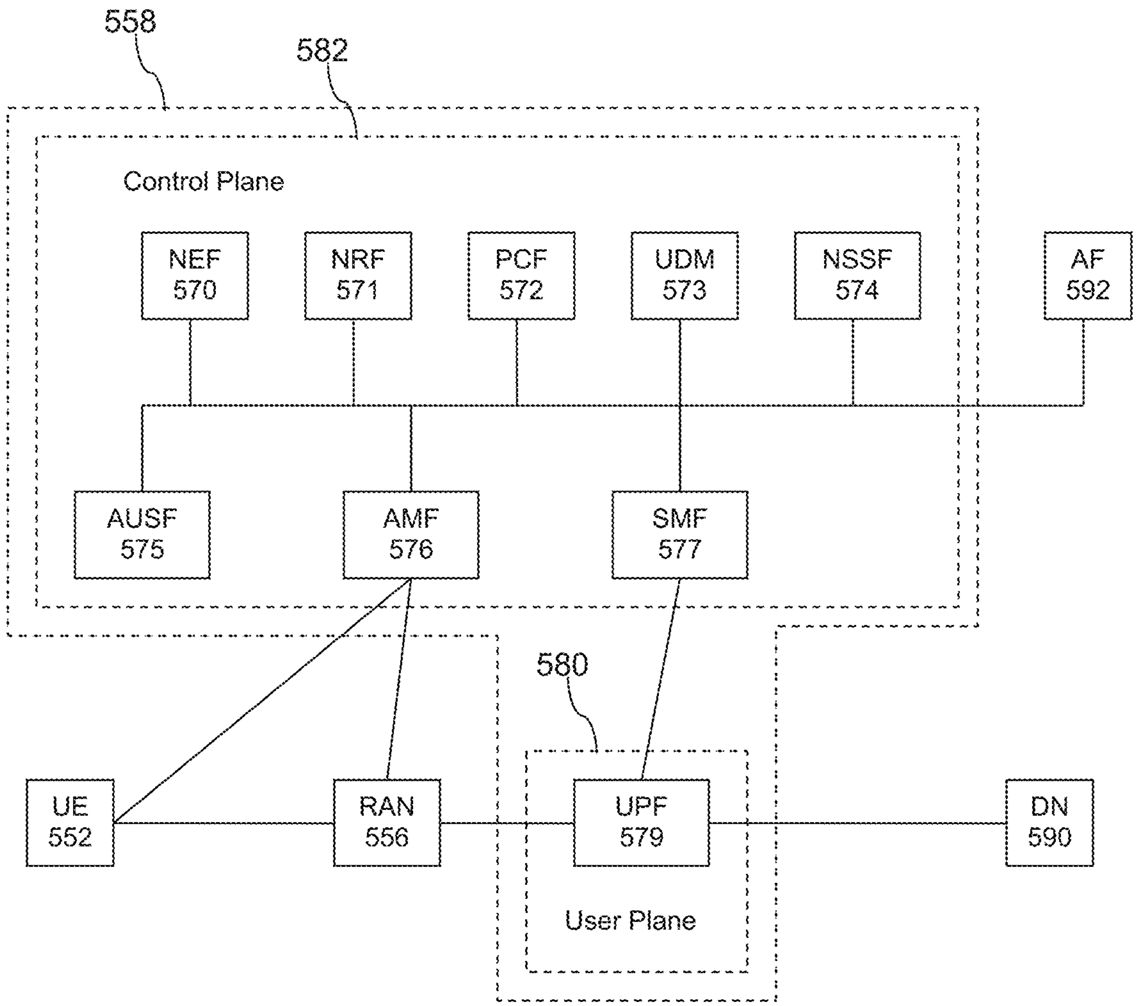

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
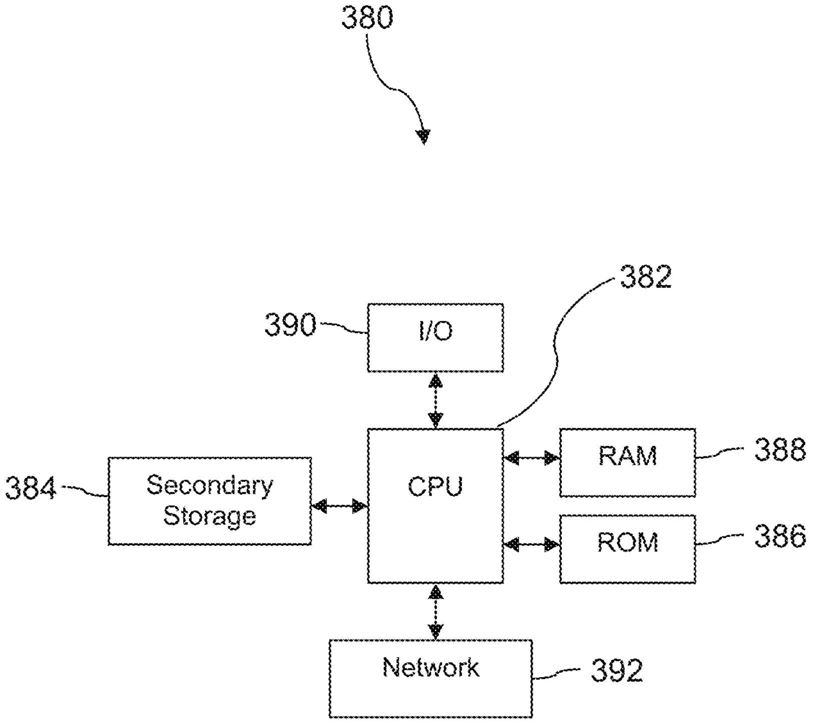
FIG. 6 is a block diagram of a computer system according to an embodiment of the disclosure.

FIG. 6 illustrates a computer system 380 suitable for implementing one or more embodiments disclosed herein. The computer system 380 may be implemented as the UE 104 and/or 106, the billing system 117, or the RSP system 118. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed by a core network to automatically transfer a subscription to a next user equipment (UE) using an electronic subscriber identity module (eSIM) profile, comprising:

receiving, by a billing system of the core network, upgrade data describing the next UE associated with a line of service in a subscription account of a subscriber, wherein the upgrade data comprises an electronic identifier (eID) identifying an embedded universal integrated circuit card (eUICC) in the next UE and an identifier of the next UE;

obtaining, by a provisioning application of a remote subscriber identity module (SIM) provisioning (RSP) system of the core network from a data store in the core network, subscription data associated with at least one of the line of service or the subscription account in response to receiving an indication of the upgrade data from the billing system, wherein the subscription data comprises a mobile station integrated services digital network (MSISDN) of a first UE associated with the line of service and network credentials used to authenticate the first UE to a carrier network associated with the core network, wherein the first UE comprises a first eSIM profile storing the subscription data;

reserving, by the provisioning application of the RSP system, the eSIM profile for the next UE in association with the line of service, wherein the eSIM profile also comprises the subscription data;

transmitting, by the provisioning application of the RSP system, the eSIM profile to the next UE while the first UE is still activated in association with the line of service;

receiving, by the provisioning application of the RSP system from the next UE, a notification that downloading or installing of the eSIM profile to the next UE is incomplete or failed, wherein the first UE remains activated in association with the line of service using the first eSIM profile; and deactivating, by the billing system, the first eSIM profile at the first UE after the provisioning application receives a confirmation notification that the eSIM profile has been successfully activated at the next UE, wherein the confirmation notification indicates whether the next UE is able to make calls and access the carrier network using data stored at the eSIM profile, wherein deactivation of the first UE is prevented until the confirmation notification is received.

2. The method of claim 1, wherein the first eSIM profile is stored in an eUICC of the first UE.

3. The method of claim 1, further comprising transmitting, by the billing system to the RSP system, the indication of the upgrade data prior to reserving the eSIM profile for the next UE in association with the line of service, wherein the indication of the upgrade data comprises at least one of an identification of the subscription account, an identification of the line of service, the eID identifying the eUICC of the next UE, or an international mobile equipment identity (IMEI) identifying the next UE.

4. The method of claim 1, further comprising displaying, by a client application of the next UE, a notification that downloading the eSIM profile at the next UE triggers deactivation of the line of service at the first UE.

5. The method of claim 4, further comprising receiving, by the client application, a selection indicating to proceed with downloading the eSIM profile at the next UE to trigger deactivation of the first UE in association with the line of service.

6. The method of claim 1, further comprising:

detecting, by a client application of the next UE, that downloading or installation of the eSIM profile at the next UE has failed, resulting in an inability to download the eSIM profile at the next UE; and displaying, by the client application, a notification at the next UE indicating that the eSIM profile was not able to be downloaded.

7. The method of claim 1, wherein the next UE is an upgraded model of the first UE.

8. A communication system, comprising:

an activation application, stored in a first non-transitory memory associated with a billing system, which when executed by a first processor, causes the first processor to be configured to receive a purchase order describing a next UE associated with a line of service in a subscription account of a subscriber, wherein the purchase order comprises an electronic identifier (eID) identifying an embedded universal integrated circuit card (eUICC) of the next UE and an identifier of the next UE;

a provisioning application, stored in a second non-transitory memory associated with a remote subscriber identity module provisioning (RSP) system, which when executed by a second processor, causes the second processor to be configured to:

obtain subscription data associated with at least one of the line of service or the subscription account, wherein the subscription data comprises a mobile station integrated services digital network (MSISDN) of a first UE associated with the line of service and network credentials used to authenticate the first UE to a carrier network associated with a core network, wherein the first UE comprises a first eSIM profile storing the subscription data;

reserve an electronic subscriber identity module (eSIM) profile for the next UE in association with the line of service in response to receiving an indication of the purchase order from the billing system, wherein the eSIM profile also comprises the subscription data;

transmit the eSIM profile to the next UE while the first UE is still activated in association with the line of service;

receive a confirmation from the next UE indicating that the eSIM profile has been successfully activated at the next UE, wherein the confirmation indicates that the next UE is able to make calls and access the carrier network using data stored at the eSIM profile; and transmit a message to the billing system indicating that the eSIM profile has been activated at the next UE and that the first eSIM profile is authorized for deactivation at the first UE, wherein the activation application further causes the first processor of the billing system to be configured to deactivate the first eSIM profile at the first UE only after receiving the message indicating successful activation at the next UE.

9. The communication system of claim 8, wherein the activation application further causes the first processor of the billing system to be configured to:

activate the eSIM profile at the next UE in association with the line of service; and deactivate the first eSIM profile at the first UE.

10. The communication system of claim 8, wherein the first eSIM profile comprises a first integrated circuit card identification (ICCID), and wherein the eSIM profile comprises a second ICCID different from the first ICCID.

11. The communication system of claim 10, wherein the provisioning application further causes the second processor of the RSP system to be configured to transmit, in the message, the second ICCID to the billing system.

12. The communication system of claim 8, wherein a client application stored in a third non-transitory memory associated with the next UE, which when executed by a third processor, causes the third processor to be configured to display a notification that downloading the eSIM profile at the next UE and successfully activating the eSIM profile at the next UE triggers deactivation of the first UE in association with the line of service.

13. The communication system of claim 12, wherein the client application further causes the third processor of the next UE to be configured to receive a selection indicating to proceed with downloading the eSIM profile at the next UE and successfully activating the eSIM profile at the next UE prior to deactivating the line of service at the first UE.

14. The communication system of claim 8, wherein the first eSIM profile remains activated at the first UE until the billing system receives the message indicating that the eSIM profile has been activated at the next UE and that the first eSIM profile is ready for deactivation at the first UE.

15. A method performed by a core network to automatically transfer a subscription to a next user equipment (UE) using an electronic subscriber identity module (eSIM) profile, comprising:

obtaining, by a provisioning application of a remote subscriber identity module (SIM) provisioning (RSP) system of a core network, from a data store in the core network, subscription data associated with at least one of a line of service or a subscription account including the line of service, wherein the subscription data comprises a mobile station integrated services digital network (MSISDN) of a first UE associated with the line of service and network credentials used to authenticate the first UE to a carrier network associated with the core network, wherein the first UE comprises a first eSIM profile storing the subscription data;

generating and reserving, by the provisioning application of the RSP system, the eSIM profile for a next UE in association with the line of service in response to receiving an indication from a billing system of the core network that the next UE has been purchased in association with the line of service, wherein the eSIM profile also comprises the subscription data;

transmitting, by the provisioning application of the RSP system, the eSIM profile to the next UE while the first UE is still activated in association with the line of service;

receiving, by the provisioning application of the RSP system from the next UE, a confirmation indicating that the eSIM profile has been successfully activated at the next UE, wherein the confirmation indicates that the next UE is able to make calls and access the carrier network using data stored at the eSIM profile;

transmitting, by the provisioning application of the RSP system to the billing system, a message indicating that the eSIM profile has been activated at the next UE and that the first eSIM profile is authorized for deactivation at the first UE; and preventing deactivation of the first eSIM profile at the first UE until the confirmation of successful activation at the next UE is received, wherein the billing system deactivates the first eSIM profile only in response to receiving the message indicating successful activation at the next UE.

16. The method of claim 15, wherein, in response to receiving the message, the method further comprises:

activating, by an activation application of the billing system, the line of service at the next UE by activating the eSIM profile at the next UE; and deactivating, by the activation application of the billing system, the line of service at the first UE by deactivating the first eSIM profile at the first UE.

17. The method of claim 16, wherein the first eSIM profile comprises a first integrated circuit card identification (ICCID), and wherein the eSIM profile comprises a second ICCID different from the first ICCID.

18. The method of claim 17, wherein the message further comprises the second ICCID.

19. The method of claim 15, wherein prior to the eSIM profile being transmitted to the next UE, the method further comprises:

displaying, by a client application of the next UE, a notification that downloading the eSIM profile at the next UE triggers deactivation of the line of service at the first UE after successful activation of the eSIM profile at the next UE;

receiving, by the client application of the next UE, a selection indicating to proceed with downloading the eSIM profile at the next UE to trigger deactivation of the line of service at the first UE after successful activation of the eSIM profile at the next UE; and transmitting, by the client application of the next UE, to the provisioning application of the RSP system, the confirmation that the eSIM profile is to be sent to the next UE.

20. The method of claim 19, wherein the transmitting, by the provisioning application of the RSP system, the eSIM profile to the next UE is only performed in response to the confirmation being received.

* * * * *